(12) United States Patent
Hoang (10) Patent No.: US 11,995,925 B2
(45) Date of Patent: May 28, 2024

(54) VISION SYSTEM FOR A VEHICLE COOLANT SYSTEM

(71) Applicant: Ford Global Technologies, LLC, Dearborn, MI (US)

(72) Inventor: Thanh Hoang, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 17/117,729

(22) Filed: Dec. 10, 2020

(65) Prior Publication Data
US 2022/0189220 A1    Jun. 16, 2022

(51) Int. Cl.
| | |
|---|---|
| *G07C 5/08* | (2006.01) |
| *B60K 11/02* | (2006.01) |
| *B60K 35/00* | (2006.01) |
| *B60K 35/28* | (2024.01) |
| *B60R 1/00* | (2022.01) |
| *B60R 11/02* | (2006.01) |
| *B60R 11/04* | (2006.01) |
| *G06F 18/214* | (2023.01) |
| *G06F 18/2431* | (2023.01) |
| *G06V 10/22* | (2022.01) |
| *G06V 20/59* | (2022.01) |
| *G07C 5/00* | (2006.01) |
| *G09G 3/20* | (2006.01) |
| *H04N 7/18* | (2006.01) |

(52) U.S. Cl.
CPC ............ *G07C 5/0825* (2013.01); *B60K 11/02* (2013.01); *B60K 35/00* (2013.01); *B60R 1/00* (2013.01); *G06F 18/214* (2023.01); *G06F 18/2431* (2023.01); *G06V 10/22* (2022.01); *G06V 20/59* (2022.01); *G07C 5/008* (2013.01); *G07C 5/085* (2013.01); *G09G 3/20* (2013.01); *H04N 7/183* (2013.01); *B60K 35/28* (2024.01); *B60K 2360/167* (2024.01); *B60K 2360/176* (2024.01); *B60K 2360/21* (2024.01); *B60R 11/0247* (2013.01); *B60R 11/04* (2013.01); *B60R 2300/30* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 3,814,314 A | * | 6/1974 | Morden | B60H 1/00471 417/313 |
| 4,643,022 A | * | 2/1987 | Werlberger | G01M 15/10 73/114.09 |
| 5,291,960 A | * | 3/1994 | Brandenburg | B60W 10/26 123/41.14 |
| 6,467,506 B1 | | 10/2002 | Nguyen | |

(Continued)

*Primary Examiner* — Clifford Hilaire
(74) *Attorney, Agent, or Firm* — Brooks Kushman P.C.; Vincent Mastrogiacomo (57) ABSTRACT

A vehicle has a prime mover to propel the vehicle, and a fluid circuit that defines a fluid passage and contains a coolant. The fluid circuit in thermal communication with the prime mover. A camera is positioned to image coolant within the fluid passage. A controller is configured to receive image data from the camera, process the image data to determine a state of the coolant in the fluid circuit, and output an indication to a user regarding the state of the coolant. A method of monitoring a fluid circuit in a vehicle is also provided.

20 Claims, 3 Drawing Sheets

(56) References Cited

U.S. PATENT DOCUMENTS

| | | |
|---|---|---|
| 10,021,133 B1 | 7/2018 | Lakshmanan et al. |
| 10,408,118 B2 * | 9/2019 | DeVenney ............... F01P 11/14 |
| 2006/0202381 A1 * | 9/2006 | Bach ...................... B29C 48/09 |
| | | 264/40.6 |
| 2007/0065141 A1 * | 3/2007 | Williamson ........... H04N 23/50 |
| | | 348/E5.025 |
| 2008/0053129 A1 * | 3/2008 | Follette .............. B60H 1/00371 |
| | | 62/244 |
| 2013/0103284 A1 * | 4/2013 | Gordon ................... F01P 11/16 |
| | | 701/101 |
| 2014/0019068 A1 * | 1/2014 | Schneider .......... G01N 33/2888 |
| | | 702/30 |
| 2018/0197048 A1 * | 7/2018 | Micks ...................... B60R 1/00 |
| 2020/0078895 A1 * | 3/2020 | Takeuchi ........... B01D 21/0036 |
| 2020/0163251 A1 * | 5/2020 | Chopra ............. H05K 7/20636 |
| 2020/0200673 A1 | 6/2020 | Coates et al. |

* cited by examiner

VISION SYSTEM FOR A VEHICLE COOLANT SYSTEM

TECHNICAL FIELD

Various embodiments relate to a vehicle with a coolant system and a method of detecting a state of the coolant system.

BACKGROUND

Vehicles conventionally have a fluid system or cooling system that operates to control the temperature of one or more components of the vehicle, such as a prime mover, other component of the propulsion system, or the like. The fluid system is conventionally provided with a temperature gauge that provides an indication to the user regarding the temperature of the fluid or coolant in the fluid system. For example, the temperature gauge may be provided as a dial-style gauge on the vehicle dashboard. The temperature gauge, while useful, provides limited information regarding the state of the fluid system.

SUMMARY

According to an embodiment, a vehicle is provided with a propulsion system having a prime mover to propel the vehicle over underlying terrain. A fluid circuit defines a fluid passage and contains a coolant, with the fluid circuit in thermal communication with the propulsion system. A camera is positioned to image the fluid passage. A controller is configured to receive image data from the camera, process the image data to determine at least one parameter of the image data, classify the image data into one of at least two classifications as a function of the at least one parameter with each classification indicative of an associated state of the coolant, and output an indication to a user regarding the state of the coolant. The at least one parameter is a color, a presence of a particle, a size of a particle, a presence of a bubble, a size of a bubble, and/or an opacity.

According to another embodiment, a vehicle is provided with a prime mover to propel the vehicle. A fluid circuit defines a fluid passage and contains a coolant. The fluid circuit in thermal communication with the prime mover. A camera is positioned to image the coolant in the fluid passage. A controller is configured to receive image data from the camera, process the image data to determine a state of the coolant in the fluid circuit, and output an indication to a user regarding the state of the coolant.

According to yet another embodiment, a method of monitoring a fluid circuit in a vehicle is provided. A fluid circuit is provided and defines a fluid passage containing coolant, with the fluid circuit in thermal communication with a propulsion system of the vehicle. A camera is positioned to image the coolant in the fluid passage. Image data from the camera is received via a controller. The image data is processed to determine a state of the coolant in the fluid circuit. An indication to a user is output regarding the state of the coolant.

DETAILED DESCRIPTION

As required, detailed embodiments of the present disclosure and provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
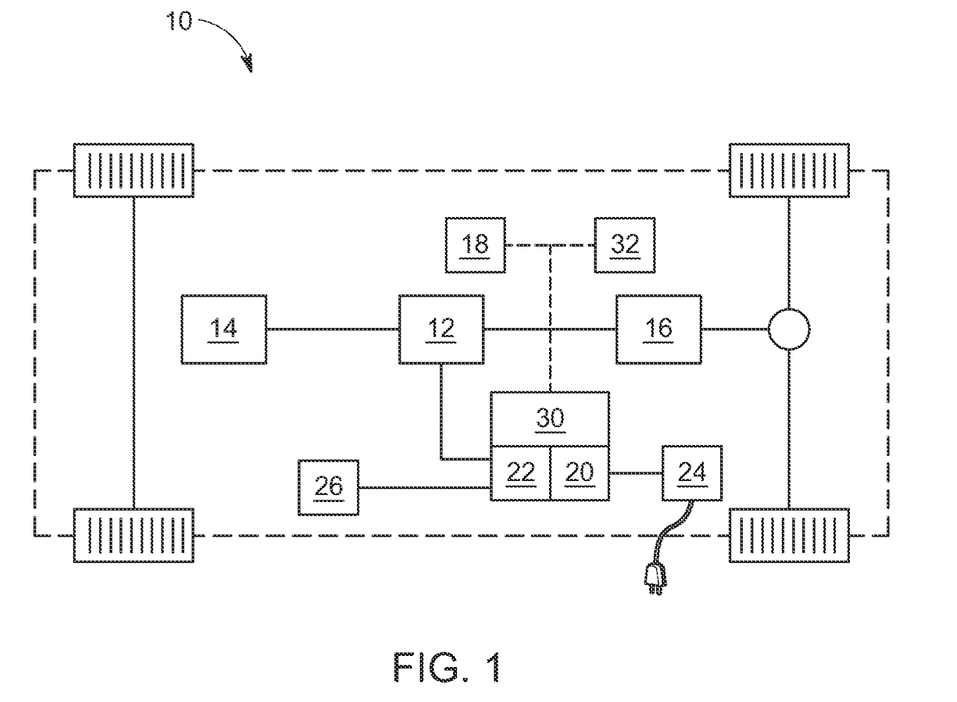
FIG. 1 illustrates a schematic of a vehicle according to an embodiment.

FIG. 1 illustrates a schematic of a vehicle 10 configured to implement the present disclosure. The vehicle 10 may be an electrified vehicle, such that the vehicle may be propelled using electric power. In various examples, the vehicle 10 may be provided by a hybrid vehicle and propelled using electric and/or mechanical power from an internal combustion engine, and may be a parallel, power split, or series hybrid electric vehicle, a battery electric vehicle, a full vehicle, a mild hybrid vehicle, a plug-in hybrid electric vehicle, or other vehicle system architectures with electric propulsion. Alternatively, the vehicle 10 may be propelled using power from only an internal combustion engine.

The vehicle has a propulsion system with one or more prime movers 12, 14 that are configured to propel the vehicle. In one example, the prime mover 12 is an electric motors or electric machines that propel the vehicle using electric power, and the associated traction battery. In other examples, the prime mover 14 is an internal combustion engine that propel the vehicle using mechanical power output by a crankshaft. In a further example, the vehicle may have multiple prime movers provided by a combination of electric machines and an internal combustion engine, or the like, as shown. Alternatively, the vehicle 10 may be provided with only a prime mover 12 or a prime mover 14. The prime mover 12 outputs mechanical power when operating as a motor to propel the vehicle. The prime mover 12 may also operate as a generator to convert mechanical power into electrical power. The prime mover(s) 12, 14 are connected to the driveline and the vehicle wheels via a transmission 16. One or both of the prime movers 12, 14 may be heated or cooled using the fluid system 30 as described below with reference to FIG. 2.

The vehicle 10 has a control system 18 with one or more controllers or control modules for the various vehicle components and systems. The control system 18 for the vehicle may include any number of controllers, and may be integrated into a single controller, or have various modules. Some or all of the controllers may be connected by a controller area network (CAN) or other system. It is recognized that any controller, circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

For a vehicle 10 having an electric machine 12, the electric machine 12 is connected to an energy storage system 20 via an inverter 22. The energy storage system 20 may be provided by a high voltage battery or traction battery. The energy storage system may forma a part of the propulsion system for the vehicle. A charger 24 may be provided to connect the vehicle to an outside electrical source, such as a charging station with 110 V or 220 V power. The traction battery 20 may be provided by a battery pack made up of one or more battery modules. Each battery module may contain one battery cell or a plurality of battery cells. The battery cells are heated and cooled using a coolant system 30 as described below with respect to FIG. 2. Additionally, electrical components for the vehicle, such as the inverter 22, the charger 24, a DC-DC converter 26 for a secondary battery or accessories, and the like, may be heated or cooled using the fluid system. The fluid system 30 is in communication with the vehicle control system 18.

The vehicle 10 includes a fluid system control system 32 as described below with respect to FIG. 2 for controlling the system 30 to heat and/or cool various vehicle components. The fluid system may additionally be used to heat the vehicle cabin as a part of a heating, ventilation, and air conditioning (HVAC) system. The fluid control system 32 is in communication with the vehicle control system 18.

The vehicle 10 has a front end and a rear end. In FIG. 1, the front end of the vehicle may be adjacent to the right pair of wheels, for example, as a front wheel drive vehicle. In other examples, the front end of the vehicle may be adjacent to the rear pair of wheels.

The vehicle 10 may also be provided with various vehicle sensors that are in communication with the control system 18 to provide an indication of a vehicle state. For example, the vehicle 10 may have a speed sensor to detect vehicle speed, an ambient or environmental temperature sensor, an odometer indicating distance traveled, a timer to determine time of operation of the fluid circuit 100, and the like.

The control system 18 of the vehicle may additionally have a transceiver and antennae that allows the vehicle to communicate with a remote server or other vehicles, for example, via a V2V, V2X, cellular, wireless, Bluetooth, or other communication protocol.

Figure 2:
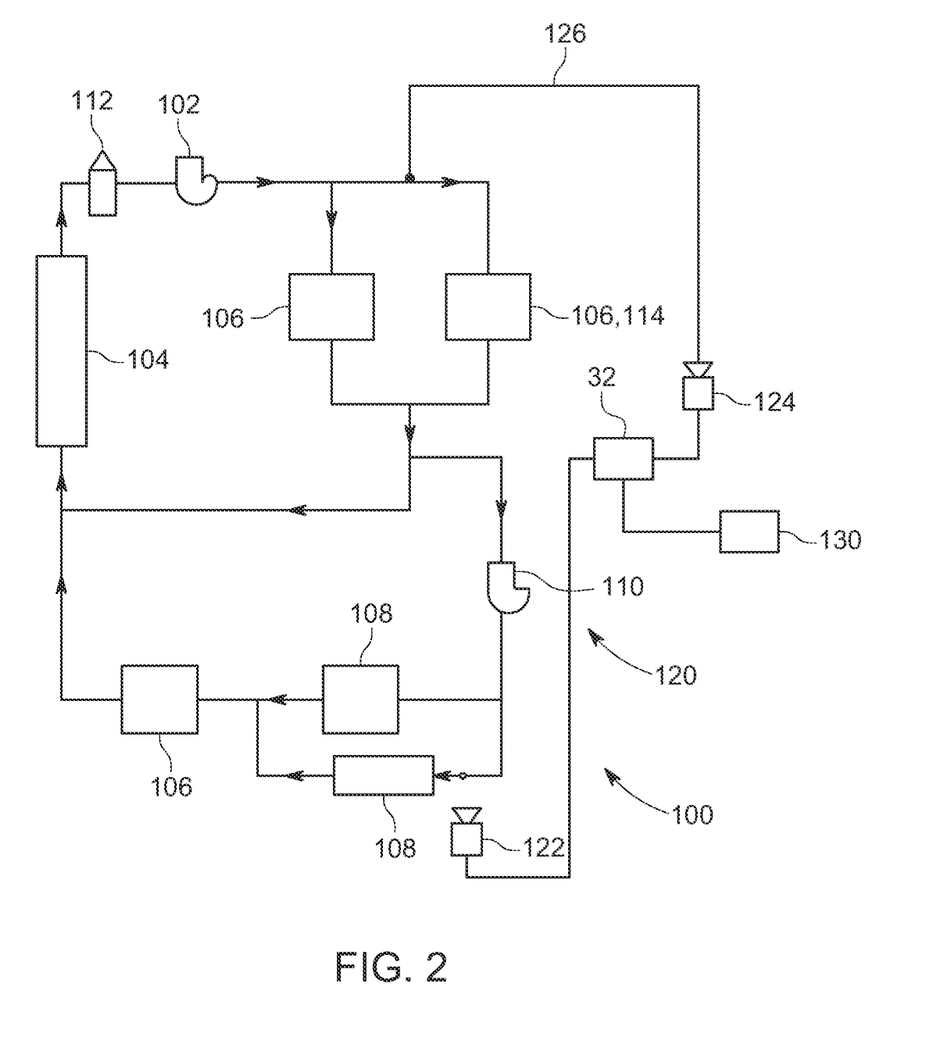
FIG. 2 illustrates a schematic of fluid systems for the vehicle according to an embodiment.

FIG. 2 illustrates a schematic of a fluid system or circuit 100 for use with the vehicle of FIG. 1 according to an embodiment. Components that are the same as or similar to those described above with respect to FIG. 1 are given the same reference number for simplicity. FIG. 2 is shown as a schematic of a fluid system, and various components may be rearranged, positioned in parallel or in series, provided in one or more fluid sub-circuits in fluid and/or thermal communication with one another, or the like.

The system 100 has a fluid circuit or loop, and may be used as a coolant system 30 for one or more vehicle components such as an internal combustion engine, traction battery, inverter, charger, or the like. The fluid circuit also provides a portion of a cabin heating system.

The fluid circulating in the system 100 is referred to as a coolant, and may include a fluid that is in a liquid-phase, a vapor-phase, or a mixed liquid-vapor phase. Additionally, the fluid may change phases within a respective circuit as it circulates, and the present disclosure may detect such a change. According to one example, the coolant in the fluid circuit 100 is controlled to be maintained in a liquid phase during operation of the system 30.

The fluid system 30 and circuit 100 is provided with a primary pump 102, one or more radiators 104, and one or more components 106 for thermal management. The cooling circuit 100 may additionally be provided with one or more heater cores 108 for use in providing cabin heat. A secondary pump 110 may also be provided. The circuit 100 may also have a degas bottle 112. The circuit 100 may additionally have various control valves, check valves, thermostats, restrictors, filters, and other elements that are not shown in FIG. 2 for simplicity.

The pump(s) 102, 110 may be mechanically driven, e.g. via an accessory drive associated with the internal combustion engine, and/or may be electrically driven via an electric motor.

When the fluid circuit 100 is in use with a vehicle 10 having an internal combustion engine as part of the propulsion system, the components 106 may be provided by an internal combustion engine, an oil cooler, a transmission oil cooler, an exhaust gas recirculation component, a turbocharger or supercharger, and the like. The internal combustion engine is shown as element 114.

When the fluid circuit 100 is in use with a vehicle 10 having an electric motor and associated traction battery as part of the propulsion system, the components 106 may be provided by a traction battery, a DC to DC converter, an AC to DC converter, a charger, and the like. The traction battery is shown as element 114. The fluid circuit 100 may additionally have a heater, such as a PTC heater, or a chiller or chiller loop to cool the traction battery and other components.

The circuit 100 may have one or more heater cores 108. In the example shown, the circuit 100 has a front heater core and a rear heater core. In other examples, the circuit 100 may have only one heater core 108, or may have more than two heater cores 108. The front heater core is adjacent to the front of the vehicle, while the rear heater core is positioned rearward in the vehicle, and may be adjacent to rear passenger compartment or seating. The rear heater core may therefore be positioned at a distance from the other components in the circuit 100. Furthermore, and based on the vehicle geometry, the rear heater core may be positioned at a local high point in the circuit 100, e.g. at a position that is below the degas bottle, but above some or all of the other components in the circuit 100. Based on the distance that the rear heater core is from the remaining components, as well as the localized high point, vapor or air may be trapped in or adjacent to the rear heater core during operation of the circuit 100.

The cooling circuit 100 defines a fluid passage that contains the fluid or coolant. The fluid passage may be provided by hose, or a cooling jacket or other fluid passages within or adjacent to the components 106, cores 108, or radiator 104 for thermal management of the component. The fluid passage(s) are in thermal communication with the propulsion system and its prime mover(s) as provided by the components 106, as well as the cores 108 and radiator 104 in the fluid system 30.

The fluid circuit 100 may be provided with one or more sensors, for example, one or more temperature sensors, one or more pressure sensors, and the like. The sensors are in communication with the controller 32. The sensors may be positioned at various locations within the fluid circuit 100.

The fluid circuit is also provided with a vision system 120 according to the present disclosure. The vision system 120 is in communication with the controller 32. The vision system 120 has one or more cameras that are positioned to image the fluid passage and coolant within the fluid circuit. In the example shown, the vision system 120 has a first camera 122 and a second camera 124. The first camera 122 is positioned to image the fluid passage adjacent to or within the rear heater core. The second camera 124 is positioned to image the fluid passage downstream of the pump 102 and upstream of the components 106, 114. In other examples, the vision system 120 may be provided with only one camera, or more than two cameras. Furthermore, the positioning of the cameras 122, 124 is according to one non-limiting example, and the camera(s) may be positioned at other locations in the fluid circuit 100 according to the present disclosure.

In one example, each camera provides a color image in the visible spectrum. In other examples, each camera provides another multi-channel image. Each camera may be provided with a digital color sensor, such as a charge coupled device (CCD) or complimentary-metal-oxide-semiconductor (CMOS) sensor. The camera may have multiple chips to acquire an RGB image, or an image in another color model. In other examples, the camera may acquire an image in the non-visible spectrum, such as near-infrared or infrared, or may acquire a multispectral image.

One or both of the cameras 122, 124 may be provided with a microphone, or have a microphone mounted adjacent to the viewing area in the fluid passage. In the example shown, the camera 124 has a microphone mounted adjacent to the rear heater core 108. The microphone is in communication with the control system 32 to provide sound or audio data to the control system 32.

According to one example, a camera in the vision system 120 is positioned adjacent to the fluid passage, as shown for example by camera 122. The fluid passage has a viewing window, such as a transparent panel, that permits the camera sensor to image the interior of the fluid passage and the coolant contained within. The viewing window is therefore provided between the camera and the fluid passage. The viewing window may provide a portion of a wall of the fluid passage. The viewing window may be provided in a line-of-sight between the camera and the fluid passage interior.

According to another example, a camera in the vision system is positioned adjacent to or remote from the fluid passage, as shown for example by camera 124. An optical fiber 126 or fiber optic bundle allows the image sensor to image the fluid passage. The fluid passage in this example may be without a viewing window for the associated camera 124. The optical fiber 126 may optionally be fed into an interior region of a component 106, core 108, or other element of the fluid system 30. A first end of the optical fiber is positioned adjacent to a sensor of the camera, and a second end of the optical fiber is positioned within or adjacent to the fluid passage.

A lighting element may additionally be provided for use with camera 122 and/or 124m or optical fiber 126, of the vision system 120 to illuminate the interior of the fluid passage when the camera acquiring image data. The lighting element may be provided by a light emitting diode or the like, and may be in communication with and controlled by the controller 32.

Each camera electronically records an image of a viewing area within the fluid passage. The controller 32 contains or is connected to an image processing unit that receives or acquires the images, and then processes them. The controller 32 may continuously acquire and process image data, or may be operated to control the cameras to periodically acquire image data for processing.

The controller 32 is in communication with each of the cameras 122, 124 to receive image data therefrom. The controller 32 processes the image data, as described below to determine a state of the fluid system or a state of the coolant within the fluid system, and outputs an indication to a user regarding a state of the coolant, e.g. via display panel 130.

The image processing unit may analyze the image data by analyzing the pixels in each image, or multi-channel image, using an imaging library processing tool, such as MATROX, to create a table or other database populated with pixel data for each image including red, green, blue [R, G, B] values, boundary information, and other properties as determined below. The image processing unit may apply one or more filters prior to analyzing the image data to reduce noise, for example, using a Fourier transform, by normalizing the data, by applying a color correction, or the like.

The image processing unit may determine the color of one or more pixels based on the RGB data to determine the color of the fluid, or may average the RGB data for the image to determine the color of the fluid. The image processing unit may determine the opacity of the fluid by determining the visibility of a feature on a far side of the fluid passage. The image processing unit may determine the presence of a particle, such as debris, by distinguishing the particle from background fluid. The image processing unit may further determine the number and/or size of particles within the image. The image processing unit may determine the presence of a bubble by distinguishing the bubble from background fluid. The image processing unit may further determine the number and/or size of bubbles within the image.

The controller 32 uses the processed image data to determine a state of the coolant or fluid within the fluid circuit 100. The controller 32 controls the display panel 130 to display the indication of the state of the coolant to the user. According to one example, the display panel 130 is provided in an interior or cabin or the vehicle. The display panel 130 may be provided by a vehicle dashboard, instrument cluster, or the like. The display panel 130 and the vehicle may further be provided without a coolant temperature gauge for the fluid circuit in the vehicle cabin. In other examples, the display panel may be provided for use or access by a maintenance station or for remote access for monitoring a vehicle fleet.

The indication to the user regarding a state of the coolant system may be provided as a simple indication to the user that the fluid system is operating normally, needs attention or maintenance, or the like. In other examples, the indication to the user may provide additional detailed information regarding the age of the fluid, the need for additional fluid refill or fluid replacement, and the like.

The control system 32 may operate and control the fluid circuit to maintain operating temperatures of the component(s) 106 within a predetermined temperature range, for example, while the vehicle is operating. The control system 32 may additionally operate and control the fluid circuit based on a state of the coolant in the fluid circuit, e.g. to maintain fluid temperature within a predetermined temperature range. The control system 32 may further control the fluid circuit differently based on an age of the coolant, the amount of coolant determined to be in the circuit, and other factors as determined by the state of the coolant. The control system 32 may control the fluid circuit 100 and fluid system 30 based on the state of the coolant as determined by the vision system 120, as well as using information provided by sensors in the circuit 100 and other vehicle sensors.

Figure 3:
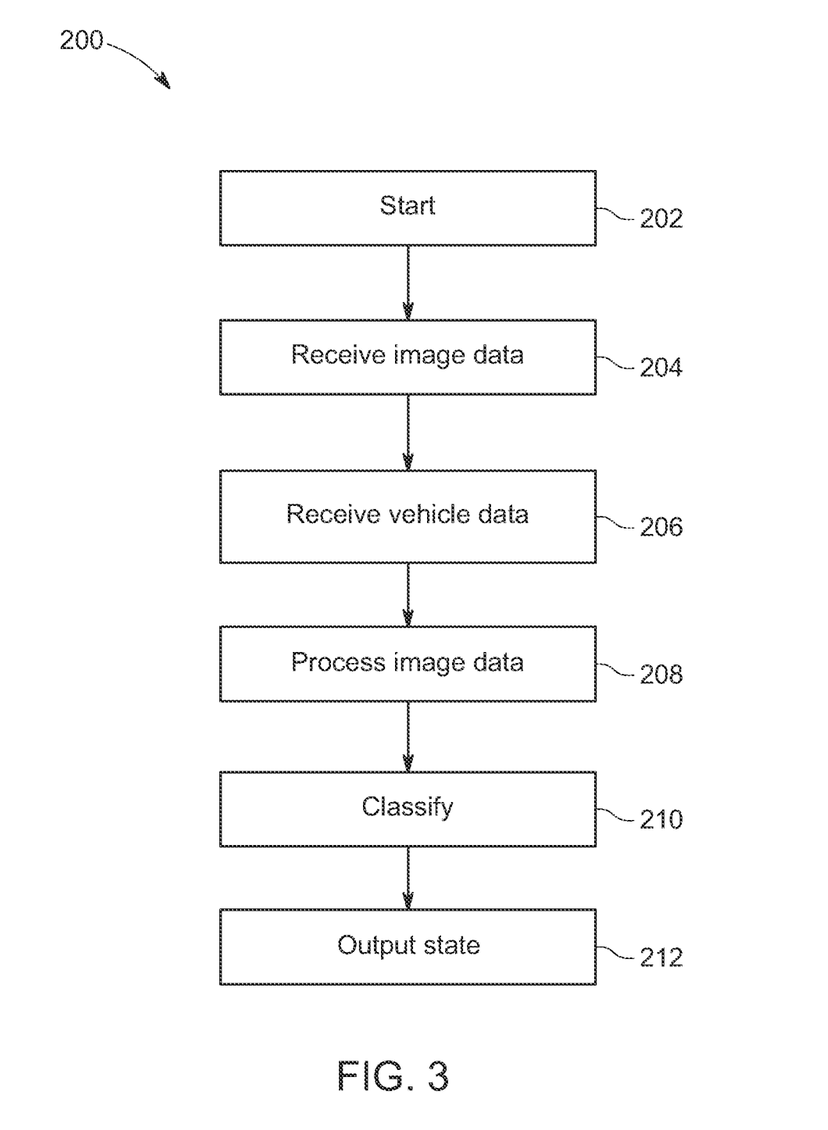
FIG. 3 illustrates a flow chart for a method of controlling the vehicle according to an embodiment.

FIG. 3 illustrates a flow chart for a method 200 according to the present disclosure. The method may be used to control the circuit 100 of FIG. 2 and control the vehicle 10 of FIG. 1 according to various embodiments. The method may be implemented by a controller such as the controller and control system 18, 32 in FIGS. 1-2. In other examples, various steps may be omitted, added, rearranged into another order, or performed sequentially or simultaneously. Although the method 200 is described with respect to use with a fluid circuit 100 as shown in FIG. 2, the method may likewise be applied for use with another vehicle component and fluid system as described above, and in a vehicle with another architecture as described above with respect to FIG. 1. At step 202, the method 200 starts.

At step 204, the controller 32 receives image data from a camera in the vision system 120. The image data may be provided as a single still image, as a series of still images that are stitched together or otherwise combined, or as a movie.

At step 206, the controller also receives a signal indicative of a vehicle state. The signal may be provided from a vehicle sensor, such as a noise level from the fluid circuit, an ambient temperature, a vehicle speed, an odometer reading to indicate distance traveled, a timer counting time of operation of the fluid circuit, and/or a pressure in the fluid circuit. The controller 32 may receive and process sound data from a microphone adjacent to the fluid circuit to determine the noise level.

At step 208, the controller processes the image data by determining at least one parameter of the image data. The at least one parameter may be a color of the fluid, a presence of a bubble, a size of a bubble, a number of bubbles, a presence of a particle, a size of a particle, a number of particles, and an opacity.

At step 210, the controller classifies the image data into one of at least two classifications as a function of the at least one parameter. Each classification is indicative of an associated state of the coolant. The controller may further classify the image data as a function of the at least one parameter and the vehicle state. In a further example, the controller classifies the image data by inputting the at least one parameter and/or the vehicle state data into a machine learning algorithm, such as a neural network, or other artificial intelligence algorithm.

According to one example, the controller 32 uses the color and/or opacity of the image data as the at least one parameter to classify the state of the coolant. New or unused fluid may be provided and is generally clear with a specified color, such as orange, yellow or green. As the fluid is used and ages, the color changes. The controller 32 may compare the color of the fluid to a color gradation scale which correlates to an age or a life remaining for the coolant, and output coolant age or coolant like remaining as the state of the coolant. Alternatively, the color may be indicative of the mixing level of the coolant, e.g. the amount of glycol mixed with water, and based on the mixing level and ambient temperature, the controller 32 may provide an indication to the user to change the mixing level by adding more glycol or water to the system based on the ambient temperature. The controller 32 may compare the clarity or opacity of the fluid to a transmissivity scale, which may correlate to air as microbubbles in the fluid system making the fluid appear cloudy.

According to another example, the controller 32 uses the color of the image in contrast with regions on the image without color. Air bubbles or other gas in the fluid passage shows as clear or as a lighter color in comparison to the fluid color. Air in the system may be indicative of a low fluid level, or a low pressure.

According to yet another example, the controller 32 uses the color in conjunction with the presence of particles, and the opacity to determine the age of the coolant. As the fluid cycle undergoes additional durability cycles, the opacity may increase based on chemical changes to the heater core.

According to yet another example, the controller 32 uses bubbles detected in the image data in conjunction with sound data from the microphone. For example, with a rear heater core, air may remain trapped in the heater core due to the localized high point. The presence of bubbles in or near the rear heater core, along with a gurgle noise from the sound data, and/or an increase in vehicle speed or high vehicle speed may indicate that the rear heater core needs degassing. Likewise, a whistle in the sound data may be indicative of a pinhole in the system, with a maintenance flag set for the user, and additional information available to the maintenance technician.

The vision system 120 and associated image processing by the controller 32 provides information as to whether the fluid circuit is full of coolant, e.g. without the presence of air or bubbles in the circuit, whether coolant is undergoing a phase change during operation of the vehicle at high load or due to low fluid levels, the lifetime remaining for the coolant, the cleanliness of the coolant as indicated by particles and color, noise in fluid system during operation of the fluid circuit, or whether the fluid circuit is operating normally.

At step 212, the controller controls the display panel to output the indication to the user regarding the state of the coolant. The controller may output the state of the coolant, e.g. lifetime remaining, or may set a maintenance flag for a user. The controller may provide additional detailed information regarding the state of the coolant to a maintenance technician for diagnostics of the fluid system.

In another example for use with method 200, the controller 32 may be configured to send the image data and vehicle state data to a remote computing platform, for example, via a wireless protocol as described above. The remote computing platform may determine at least one parameter of the image data, classify the image data into one of at least two classifications as a function of the at least one parameter, and create a database of coolant states as a function of the at least one parameters, wherein each classification is indicative of an associated state of the coolant. The remote computing platform then sends the database to the vehicle controllers 18, 32 for use in monitoring the coolant system 30. Alternatively, the controller 32 of one vehicle creates a database which is then uploaded or otherwise sent to a remote computing platform. This may be used to build or update a database using vehicle fleet data, or may be used to monitor a vehicle fleet.

The machine learning algorithm may be provided as a neural network with an initial training data set of predefined classifications based on parameters of the image or vehicle data. The machine learning algorithm finds patterns in the training data set, and then may use these patterns to run against data obtained during vehicle testing or vehicle operation. The controller may classify the image and vehicle data into classifications such as normal operation, replace coolant, age of the coolant, cleanliness, coolant mixing level, gurgle noise, bubbles or opacity for phase change, air present in the coolant, an amount of air present in the coolant, whether the circuit is de-aerated, time to de-aeration, whether air reenters the circuit after idle or shutdown, whistle noise for venting, color, particles, and opacity for age, and the like.

In one example, the machine learning algorithm may be configured to provide a known functional relationship between sets of input data and resulting classifications and states. The machine learning algorithm may be trained to learn relationships using a supervised learning process. The learned relationships may then be used with new sets of image data and vehicle states to predict a state of the coolant during vehicle operation.

The machine learning algorithm may be provided as a neural network with an initial training data set of predefined classifications based on parameters of the image or vehicle data. The machine learning algorithm finds patterns in the training data set, and then may use these patterns to run against data obtained during vehicle testing or vehicle operation. The controller may classify the image and vehicle data into classifications such as normal operation, replace coolant, age of the coolant, cleanliness, coolant mixing level, gurgle noise, bubbles or opacity for phase change, air present in the coolant, an amount of air present in the coolant, whether the circuit is de-aerated, time to de-aeration, whether air reenters the circuit after idle or shutdown, whistle noise for venting, color, particles, and opacity for age, and the like.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
   a propulsion system having a prime mover to propel the vehicle over underlying terrain;
   a fluid circuit defining a fluid passage and containing a coolant, the fluid passage in fluid communication with the propulsion system on-board the vehicle, the fluid circuit comprising a heater core to provide cabin heat for the vehicle, a pump, and a degas bottle adjacent to the pump;
   a camera supported by the vehicle and positioned to image the coolant within the fluid passage and adjacent to or within the heater core; and
   a controller supported by the vehicle and configured to receive image data from the camera, process the image data to determine at least one parameter of the image data, classify the image data into one of at least two classifications as a function of the at least one parameter with each classification indicative of an associated state of the coolant, and output an indication to a user regarding the state of the coolant while the vehicle is operating, wherein the at least one parameter comprises a presence of a bubble and a size of a bubble, and the associated state is a phase change of the coolant.

2. The vehicle of claim 1 wherein the at least one parameter further comprises a color of the coolant, a presence of a particle, and an opacity; and
   wherein the controller classifies the coolant using the color of the coolant, the presence of a particle, and the opacity to indicate between coolant states associated with an age of the coolant and a mixing level of the coolant.

3. A vehicle comprising:
   a prime mover to propel the vehicle;
   a fluid circuit defining a fluid passage and containing a coolant, the fluid circuit comprising a pump, a heater core to provide cabin heat for the vehicle, and a degas bottle, wherein the heater core is at a local high point in the circuit below the degas bottle, and wherein the fluid circuit is in thermal communication with the prime mover and on-board the vehicle;
   a first camera supported by the vehicle and positioned to image the coolant within the fluid passage adjacent to or within the heater core;
   a second camera supported by the vehicle and positioned to image the coolant within the fluid passage and immediately downstream of the pump; and
   a controller supported by the vehicle and configured to receive image data from the first camera and additional image data from the second camera, process the image data and the additional image data to determine a state of the coolant in the fluid circuit, and output an indication to a user regarding the state of the coolant while the vehicle is operating.

4. The vehicle of claim 3 further comprising a display panel in a cabin of the vehicle, wherein the controller controls the display panel to display the indication to the user; and
   wherein the vehicle is without a coolant temperature gauge for the fluid circuit.

5. The vehicle of claim 3 wherein the fluid circuit comprises a viewing window, and wherein the viewing window is positioned between the camera and the fluid passage.

6. The vehicle of claim 3 wherein the camera further comprises an optical fiber having a first end adjacent to a sensor of the camera, and a second end positioned within the fluid passage.

7. The vehicle of claim 3 wherein the prime mover comprises an internal combustion engine.

8. The vehicle of claim 3 wherein the prime mover comprises an electric machine and a traction battery.

9. The vehicle of claim 3 wherein the controller is further configured to determine at least one parameter of the image data, and classify the image data into one of at least two classifications as a function of the at least one parameter, wherein each classification is indicative of an associated state of the coolant, and wherein the at least one parameter comprises a presence of a bubble, and a size of a bubble.

10. The vehicle of claim 3 wherein the controller is further configured to receive a signal indicative of a vehicle state, the vehicle state comprising one of a vehicle speed and a distance traveled; and
    wherein the controller is further configured to determine at least one parameter of the image data, and classify the image data into one of at least two classifications as a function of the at least one parameter and the vehicle state, wherein each classification is indicative of an associated state of the coolant, and wherein the at least one parameter is a presence of a bubble, and/or a size of a bubble.

11. The vehicle of claim 3 wherein the image data comprises a still image and/or a movie with a series of still images.

12. The vehicle of claim 3 further comprising a microphone positioned adjacent to the camera to detect sound within the fluid passage;
    wherein the controller is further configured to receive sound data from the microphone, and process the sound data and the image data to determine the state of the coolant in the fluid circuit, wherein the state of the coolant is indicative of the heater core needing degassing in response to the image data indicating a presence of a bubble and/or a size of a bubble, and the sound data indicating a gurgle noise.

13. The vehicle of claim 3 wherein the controller is further configured to send the image data to a remote computing platform to determine at least one parameter of the image data, classify the image data into one of at least two classifications as a function of the at least one parameter, and create a database of coolant states as a function of the at least one parameters, wherein each classification is indicative of an associated state of the coolant.

14. The vehicle of claim 3 wherein the controller is further configured to determine at least one parameter of the image data, and classify the image data into one of at least two classifications as a function of the at least one parameter, wherein each classification is indicative of an associated state of the coolant, wherein the at least one parameter is a presence of a bubble, and/or a size of a bubble.

15. The vehicle of claim 3 wherein the heater core is a rear heater core adjacent to a rear passenger compartment in the vehicle, and wherein the fluid circuit further comprises a front heater core adjacent to the front of the vehicle and adjacent to the pump and the degas bottle; and wherein the rear heater core is positioned at the local high point in the circuit below the degas bottle and above the pump and the front heater core.

16. A method of monitoring a fluid circuit in a vehicle, the method comprising:

providing a fluid circuit on-board the vehicle defining a fluid passage and containing coolant, the fluid circuit in thermal communication with a propulsion system of the vehicle, wherein the fluid circuit comprises a pump, a heater core, and a degas bottle, wherein the heater core is at a local high point in the circuit below the degas bottle and above the pump;

positioning a first camera on-board the vehicle to image the coolant within the fluid passage adjacent to or within the heater core;

positioning a second camera on-board the vehicle to image the coolant within the fluid passage immediately downstream of the pump;

receiving image data from the first camera and receiving additional image data from the second camera via a controller while the fluid circuit and vehicle are operating;

processing the image data and the additional image data to determine a state of the coolant in the fluid circuit; and outputting an indication to a user regarding the state of the coolant while the fluid circuit and vehicle are operating.

17. The method of claim 16 further comprising determining at least one parameter of the image data; and classifying the image data into one of at least two classifications as a function of the at least one parameter, wherein each classification is indicative of an associated state of the coolant;

wherein the at least one parameter is a presence of a bubble, and/or a size of a bubble.

18. The method of claim 17 further comprising receiving a signal indicative of a vehicle state; and classifying the image data into the one of the at least two classifications as a function of the at least one parameter and the vehicle state;

wherein the vehicle state is a vehicle speed, and/or a distance; and wherein the state of the coolant is indicative of the heater core needing degassing in response to the image data indicating the presence of the bubble and/or the size of the bubble, and the vehicle state indicating an increase in vehicle speed.

19. The method of claim 16 further comprising sending the image data to a remote computing platform to determine at least one parameter of the image data, classify the image data into one of at least two classifications as a function of the at least one parameter, and create a database of coolant states as a function of the at least one parameters, wherein each classification is indicative of an associated state of the coolant.

20. The method of claim 16 further comprising displaying the indication to the user on a display panel in a vehicle cabin, wherein the vehicle is without a temperature gauge for the fluid circuit.

\* \* \* \* \*